US008695878B2

(12) United States Patent
Burnside et al.

(10) Patent No.: US 8,695,878 B2
(45) Date of Patent: Apr. 15, 2014

(54) SHELF-MONITORING SYSTEM

(75) Inventors: Walter D. Burnside, Dublin, OH (US);
Joseph M. Ryan, Jr., Loveland, CO (US)

(73) Assignees: DJB Group LLC, Dublin, OH (US);
Wistron Neweb Corporation, Hsinchu (TW)

( * ) Notice: Subject to any disclaimer, the term of this patent is extended or adjusted under 35 U.S.C. 154(b) by 198 days.

(21) Appl. No.: 13/222,079

(22) Filed: Aug. 31, 2011

(65) Prior Publication Data

US 2013/0048724 A1    Feb. 28, 2013

(51) Int. Cl.
*G06F 19/00* (2011.01)

(52) U.S. Cl.
USPC ........... 235/385; 235/440; 235/487; 340/5.92

(58) Field of Classification Search
None
See application file for complete search history.

(56) References Cited

U.S. PATENT DOCUMENTS

| | | | |
|---|---|---|---|
| 4,566,337 A | 1/1986 | Smart | |
| 4,794,248 A | 12/1988 | Gray | |
| 5,243,183 A | 9/1993 | Barron, Jr. et al. | |
| 5,254,853 A | 10/1993 | Reich | |
| 5,302,942 A | 4/1994 | Blau | |
| 5,379,657 A | 1/1995 | Hasselman et al. | |
| 5,469,262 A | 11/1995 | Keen et al. | |
| 5,567,931 A | 10/1996 | Amend et al. | |
| 5,671,362 A | 9/1997 | Cowe et al. | |
| 6,232,876 B1 | 5/2001 | Maloney | |
| 6,307,475 B1 | 10/2001 | Kelley | |
| 6,388,573 B1 | 5/2002 | Smith et al. | |
| 6,509,836 B1 | 1/2003 | Ingram | |
| 6,570,492 B1 * | 5/2003 | Peratoner | 340/5.91 |
| 6,600,418 B2 | 7/2003 | Francis et al. | |
| 6,601,764 B1 | 8/2003 | Goodwin, III | |
| 6,750,769 B1 | 6/2004 | Smith | |
| 6,812,838 B1 | 11/2004 | Maloney | |
| 6,866,195 B2 | 3/2005 | Knowles et al. | |
| 7,081,818 B2 | 7/2006 | Eckstein et al. | |
| 7,100,052 B2 | 8/2006 | Ghazarian | |
| 7,271,724 B2 * | 9/2007 | Goyal et al. | 340/572.1 |
| 7,298,330 B2 | 11/2007 | Forster et al. | |
| 7,667,572 B2 | 2/2010 | Husak et al. | |
| 7,667,575 B2 | 2/2010 | Husak et al. | |
| 7,672,872 B2 | 3/2010 | Shanton | |
| 7,690,568 B2 | 4/2010 | Shimura et al. | |

(Continued)

FOREIGN PATENT DOCUMENTS

| | | |
|---|---|---|
| JP | 2003-146414 A | 5/2003 |
| WO | 01/06434 A1 | 1/2001 |
| WO | 02/33511 A2 | 4/2002 |
| WO | 2004/104957 A1 | 12/2004 |

OTHER PUBLICATIONS

Notification of Transmittal of the International Search Report and the Written Opinion of the International Searching Authority, or the Declaration, International Search Report and Written Opinion of the International Searching Authority dated Feb. 28, 2013 of corresponding International PCT Application No. PCT/US2012/050848, filed Aug. 15, 2012.

*Primary Examiner* — Sonji Johnson
(74) *Attorney, Agent, or Firm* — Pearne & Gordon LLP

(57) ABSTRACT

A system and method for monitoring retail shelf inventory that combines bar code and RFID technologies to permit electronic data entry of retail item shelf assignments and real time reporting of item removal from display/dispensing shelves.

10 Claims, 3 Drawing Sheets

(56) References Cited

U.S. PATENT DOCUMENTS

| | | |
|---|---|---|
| 7,692,532 B2 | 4/2010 | Fischer et al. |
| 7,817,014 B2 | 10/2010 | Krishna et al. |
| 8,260,456 B2 | 9/2012 | Siegel et al. |
| 2002/0017603 A1 | 2/2002 | Haberer et al. |
| 2002/0104013 A1 | 8/2002 | Ghazarian |
| 2003/0216969 A1 | 11/2003 | Bauer et al. |
| 2003/0234775 A1* | 12/2003 | Capurso et al. ............... 345/204 |
| 2004/0099735 A1* | 5/2004 | Neumark ....................... 235/385 |
| 2004/0152082 A1* | 8/2004 | Troup et al. ...................... 435/6 |
| 2004/0195319 A1 | 10/2004 | Forster |
| 2005/0040934 A1 | 2/2005 | Shanton |
| 2005/0150952 A1 | 7/2005 | Chung |
| 2006/0103532 A1 | 5/2006 | Van Fleet |
| 2006/0149640 A1* | 7/2006 | Gordon et al. .................. 705/26 |
| 2006/0192002 A1 | 8/2006 | Forster |
| 2006/0279527 A1* | 12/2006 | Zehner et al. .................. 345/107 |
| 2007/0024447 A1* | 2/2007 | Burnside et al. ............ 340/572.1 |
| 2007/0035380 A1 | 2/2007 | Overhultz et al. |
| 2007/0095911 A1* | 5/2007 | Shimura et al. ................ 235/440 |
| 2008/0284654 A1* | 11/2008 | Burnside et al. ........ 343/700 MS |
| 2009/0108991 A1 | 4/2009 | Chadbourne et al. |
| 2010/0017347 A1 | 1/2010 | Hagemann et al. |
| 2010/0039228 A1 | 2/2010 | Sadr et al. |
| 2010/0060453 A1* | 3/2010 | Kushida et al. ............ 340/572.1 |
| 2010/0060457 A1 | 3/2010 | Burnside et al. |
| 2010/0116885 A1* | 5/2010 | Dearing et al. ................ 235/385 |
| 2010/0223147 A1* | 9/2010 | Oishi .............................. 705/23 |
| 2010/0277321 A1 | 11/2010 | McElwaine et al. |
| 2010/0328037 A1* | 12/2010 | Thomas et al. ............... 340/10.1 |
| 2011/0240731 A1* | 10/2011 | Lee et al. ....................... 235/375 |

* cited by examiner

SHELF-MONITORING SYSTEM

BACKGROUND OF THE INVENTION

The invention relates to a system for integrating bar code and RFID tag technologies in retail dispenser shelving to provide real-time shelf inventory status.

PRIOR ART

Currently, retailers routinely assign employees to walk through the aisles of a store to check for shelf items that are depleted or nearly depleted. On the basis of what is seen by the clerk, replacement items can be drawn from the "backroom" or warehouse. It would be beneficial to avoid the use of employees' time in these shelf inventory surveys.

Certain products being removed from a retail shelf by a customer may be complemented with other products, services, or advice that could be provided by the store management. Therefore, it would be advantageous to advertise or announce such complementary products or services to a customer with a video or audio presentation starting at the time an item is drawn from a shelf.

Certain consumer items such as baby formula, medications and cosmetics, are targeted by organized crime. Criminals steal products by removing them from shelves and exiting a store by some subterfuge without paying for the stolen items. This activity is often characterized by a thief quickly taking all or most of a targeted item from a shelf. It would be therefore desirable for a retailer to have the ability to immediately detect a circumstance and location where an unusual number of items are removed from a shelf at the same time. Data on the time and frequency that items are removed from a shelf can be helpful in uncovering patterns and sources of "shrinkage" where there is no apparent explanation for a loss of inventory.

RFID tag and reader technology has been extensively developed, but has yet to be widely implemented in retail operations because of costs. Such costs include not only the RFID tags, but also, labor and equipment to attach the tags as well as the associated hardware and software necessary for implementation of this technology. Some metal objects and liquids cannot easily or effectively use RFID tags. It would be desirable to derive some of the potential benefits of RFID technology in retail applications by applying this technology on a limited basis that can avoid otherwise currently prohibitive costs.

SUMMARY OF THE INVENTION

The invention is embodied in retail shelf systems that combine bar code and RFID technologies to achieve an adaptable, low cost, real time monitoring of shelf inventory. In various embodiments of the invention, a retail display and dispensing shelf has, from front to back, rows of RFID tags (hereafter "tags" or "tag" when singular, each tag with a unique identity and a unique bar code spatially associated with each row of tags. The system further includes an antenna arrangement, preferably multiple special twin-feed antennas, associated with the shelf and connected to a tag reader. The reader interfaces with a controller, inter alia, to store the identity of each tag row by a unique bar code, the location of the row on a shelf, the location of the shelf in the store, the identity of each of the tags associated with the row, and, if desired, their respective location in a row. On each shelf, the tags are preferably arranged in patterns corresponding to the patterns that retail items are arranged on a shelf.

A portable bar code reader or scanner is used to electronically collect and feed data to the computer or controller. One effective way of implementing the invention is to correlate individual unique shelf bar codes, each embodied in a printed label, for instance, with a set of tags, each of unique identity.

The tags can be fixed to a composite planar board that includes an electrically conductive ground plane spaced below the tags. The composite board can be disposed on a conventional shelving unit. The system relies on a medium that blocks communication between a tag and an antenna associated with the respective shelf when an item is resting on the shelf and overlies a tag. The medium can be the item itself, or some other barrier to radio waves that is displaced when the item is removed.

The tags may be, but not necessarily, located in a pattern that corresponds, one for one, with the layout of items on a shelf. Ordinarily, all of the items being displayed on a shelf in a row or other pattern at a site associated with a common shelf bar code will be identical.

The system can include any number of shelves and any number of bar code sites on any particular shelf. When an item is removed, an underlying tag is no longer blocked from communicating with a shelf antenna. A signal from an unblocked tag is received by an antenna and relayed to the reader of the system. The controller registers the signal as an item removed from the shelf within a very short time of the actual removal. The controller can initiate video and/or audio announcements while the customer is still at the area of the shelf. The controller can produce a signal requesting a re-stock of the shelf when all or most of the items are removed from a bar code site. If many of the items are removed en masse, the controller can signal a potential theft attempt.

A significant advantage of the system comes from the integration of bar code and RFID technologies. As suggested, this integration enables the identity of an item on a shelf and the shelf row to which it is assigned to be electronically recorded by scanning the item UPC and the bar code of the row to which it is assigned with the hand-held bar code scanner. This feature is of significant advantage to those retailers who routinely shift the position of merchandise within a store from one shelf to another. The location of items reorganized among different shelves can be quickly and efficiently electronically entered and recorded simply with a portable hand-held bar code reader. The reader scans and records the bar code at the site of a row on a shelf and the UPC or bar code on an item to be placed on a shelf at such site. This data is transmitted to the system controller electronically so that human labor is minimized and data errors are reduced.

DESCRIPTION OF THE PREFERRED EMBODIMENT

Figure 1:
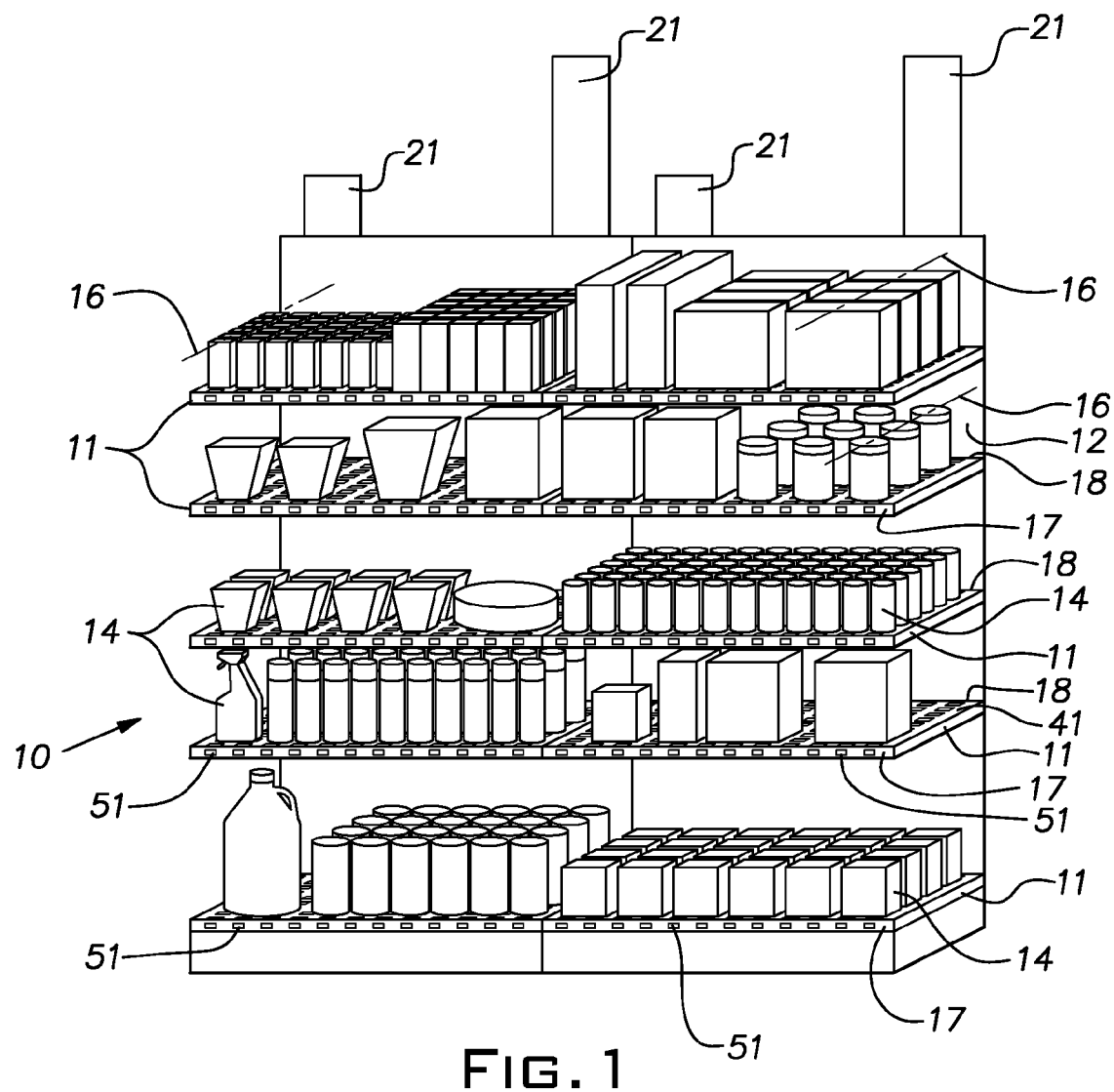
FIG. 1 is a front view of a retail shelf unit embodying the invention.

FIG. 1 illustrates a shelf unit 10 typical of those found in retail stores or similar establishments that display goods to store customers. The unit 10 dispenses retail items in the sense that a customer can select a product and remove it from a shelf. The shelf unit 10 has several shelves 11 vertically spaced from one another. The shelves 11 customarily are arranged in horizontal planes, and are typically substantially longer than their front to rear (depth) dimension. A vertical back panel 12 prevents items from falling off the rear edge of the shelves. Various products or items 14 can be displayed on the same or different shelves 11. As is conventional, identical items are arranged in rows 16 extending between a front 17 to a back 18 of a shelf 11. In the illustrated case, a set of elongated twin feed, flat plane antennas 21 are vertically arranged in a vertical plane immediately behind the back panel 12. The antennas 21 may be of the type known from U.S. Patent Publication No. US-2010-0060457-A1, the disclosure of which is incorporated herein by reference. The back panel 12 is made of a material that is transparent to radio waves. While the antennas 21 may each be identically constructed, they are preferably arranged so that some are inverted relative to others, some are flipped face-to-face from others, and some are higher than others so as to increase the diversity of the orientation of electromagnetic waves generated by the antennas. This diversity includes polarization and spatial diversities.

Figure 2:
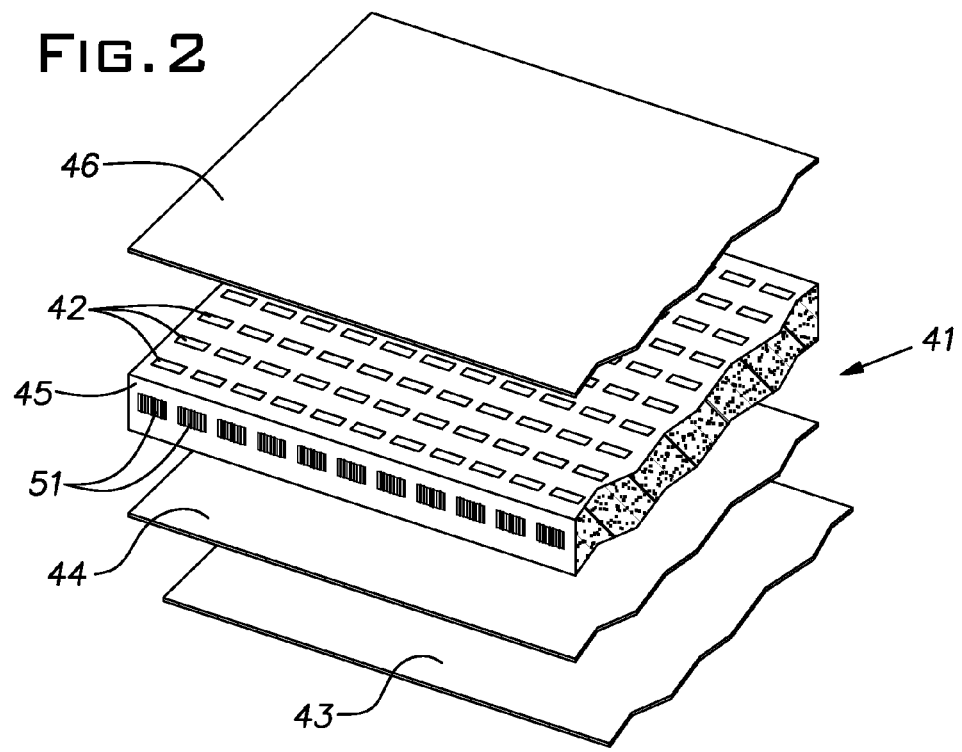
FIG. 2 is a fragmentary diagrammatic exploded view of a shelf component of the invention.

FIG. 2 reveals one example of a panel assembly 41 with tags 42 for electronically maintaining real-time inventory of items on the shelves 11 of the unit 10. The panel assembly 41 is a generally flat composite of individual layers including a bottom skin 43, an electrically conducting ground plane 44, a low density plastic foam core 45 and a top skin 46. The bottom and top skins 43, 46 can be any suitable plastic film such as a polyolefin, ABS or vinyl; the top sheet or skin 46, at least, is of suitable durability to resist damage or premature wear when items, including tin cans, for example, are placed on or removed from the panel assembly 41 without care. Both the top sheet or skin 46 and foam core 45 are substantially or completely transparent to radio waves. The core 45 is preferably an open or closed cell foam of a common thermoplastic or thermoset material and has a thickness of at least about ¾" to space the tags 42 from the ground plane 44. The layers 43-46 are held together at their respective interfaces by suitable adhesives, by welding, by mechanical fasteners or by other expedient. The tags 42 can be secured to either the foam core 45 or the top skin 46 or both. The panel assembly 41 is dimensioned so that its length and width are suitably received on a shelf 11 or its length can be an even fraction of the length of the shelf on which it will be placed so that a plurality of panel assemblies can be used to cover a shelf.

The tags 42, which are commercially available, are RFID tags that have a rectangular footprint and are essentially flat. The tags 42 are preferably arranged to correspond to a row 16 in which items are placed on the shelves 11 as described above. Ideally, but not necessarily, the spacing between adjacent tags 42 of a row 16 corresponds to the front to back spacing of items being retailed on the relevant row of a shelf 11. Preferably, but again not necessarily, the spacing between tag rows is the same as the spacing between rows of retail items on a shelf 11. Each tag 42 on any panel assembly 41 used in a retail store installation has a unique identity. In accordance with the invention, each row 16 of tags 42 has associated with it a bar code 51 located on the front of the panel assembly 41 in line with a respective row. The bar code 51 can be printed on a pressure sensitive label applied to the edge of the panel assembly 41 so that it is in a position to be optically scanned.

From the foregoing, it will be understood that the full area of each shelf 11 of the unit 10 shown in FIG. 1 will be covered by a panel assembly 41 like or similar to that illustrated in FIG. 2. If desired, panel assemblies 41 can be constructed of sufficient strength to form the shelves themselves. On the other hand, where the shelves 11 are metal sheets without major holes, the ground plane 44, and the bottom skin 43, can be omitted. The retail items located on the shelves 11, by virtue of their dense dielectric properties, or being in a metal container, or having a metal foil blank attached to their bottom, block radio wave energy and thereby mask the tags 42. The electrically conducting ground plane 44, likewise, blocks this energy. Electromagnetic waves travelling parallel or nearly parallel to the plane of the panel assembly 41, i.e. through the plane of the foam core 45 and, therefore, parallel to the plane of the tags 41 are not effective in exciting the tags. Therefore tags 42 receiving energy only in this direction will not be seen by the shelf antennas 21.

Retail items opaque to radio waves and properly located on a shelf will overlie and electromagnetically shield underlying tags 42 so that these tags cannot be seen by the shelf antennas 21. Contrarily, when a retail item is removed from a shelf, the tag 42 beneath it is exposed to electromagnetic energy and will be immediately seen by the shelf antennas 21.

Figure 5:
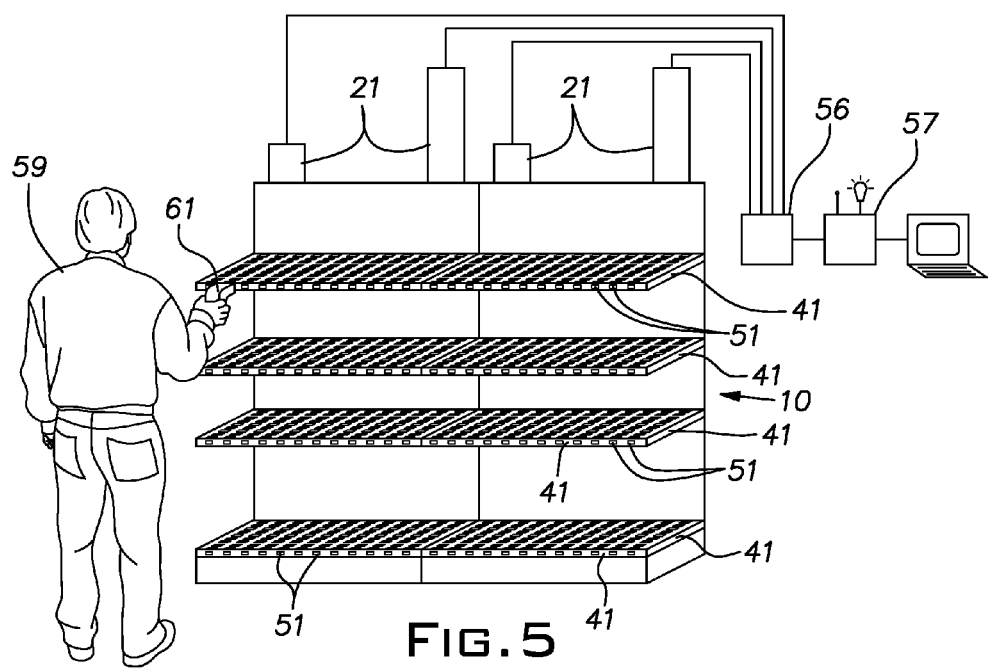
FIG. 5 is a schematic view of a shelf system illustrating, inter alia, a RFID tag reader, a hand-held bar code reader, and a controller.

FIG. 5 diagrammatically illustrates additional parts of the shelf system that achieves adaptable "real-time" inventory status. The shelf antennas 21 communicate with a reader unit 56, known in the art, that identifies any tags 42 illuminated by the antennas. The reader unit 56, in turn, communicates with a computer-based controller 57 which is programmed to monitor and report changes in shelf inventory. While shown as separate components, the reader 56 and controller 57 can be integrated. The shelf inventory information, garnered by the controller 57, can regularly be used to initiate shelf restocking and reordering of product. The disclosed system has the significant benefit of monitoring the shelf inventory on a real-time basis, being responsive typically within seconds to a change in the number of tags being seen by the shelf antennas 21.

Under normal conditions, in addition to signaling a need to replenish the shelf with certain items, the controller 57 can record data reflecting the time and date of item removal. The controller 57 can be programmed to issue a lost item report when an item has been removed from a shelf but has not appeared at a cash register within a prescribed time. In other special circumstances, the system can respond in other ways. For example, experience has shown organized crime thieves target certain retail products that can be easily hidden and easily sold. To be profitable for the perpetrators, these thefts are characterized by quickly grabbing all or most of the same item from a shelf. The controller 57 can be programmed to respond to a sudden reduction of identical shelved items by instantly sending an alarm to appropriate personnel. The alarm signal can include identity of the precise location in a store where the activity is occurring. The controller can, for example, focus a security camera at the identified location in the store to record the activity and pictures of suspected culprits.

The employee 59 stocking shelves can be issued an identification badge that can be electronically recognized by the shelf system controller 57. For example, the badge can have an RFID tag associated with it that can be seen by the shelf antennas 21. Alternatively, the employee badge can have an associated bar code capable of being read and electronically reported by the portable bar code scanner 61 being used by the employee when stocking shelves. With the controller 57 aware of the identity of the person stocking a shelf at the time of this activity his productivity can be observed and accurately measured. If desired, the controller 57 can be programmed to cause the restocking labor to be video monitored. The metrics recorded by the controller can include the number of items actually being placed on a shelf and the time expended since the shelf antennas 21 report changes in shelf inventory on a real time basis. The identity of the person stocking the shelf, his promptness and his efficiency can be recorded and made available to the manufacturer of an item being stacked to assure that the manufacturer's item is displayed according to the terms existing between the retailer and the manufacturer.

The system, through the antennas 21 and reader 56 can detect a customer carrying a loyalty card with an embedded RFID tag identifying the customer. This feature can be used for marketing purposes based on the customer withdrawing a particular item from a shelf.

The system can readily monitor compliance with a "planogram" by which store management dictates the location of all shelves and items to be shelved. Assuming each shelf is initially properly laid out according to an authorized floor plan and each shelf and its associated tags are registered in the controller memory, the controller can be programmed to verify that the items being placed on each shelf row (with a representative item first scanned for its UPC code) as the items specified by the planogram.

An important aspect of the invention is the ability to electronically enter and record the selected location for each kind of item to be placed on a shelf 11 in a retail store or other establishment. Moreover, the system enables the location at which items are to be shelved to be changed whenever necessary or desired and allows such a change to be entered and recorded electronically. Such changes will routinely occur when new products are introduced by a supplier and/or when the store management chooses to rearrange the product display for merchandising purposes or when existing products are discontinued either by the retailer or by the supplier.

Ordinarily, the bar code 51 (which is a unique number) at each shelf row 16 will have a unique set of tags 42 associated with it and this correspondence will be stored in the memory of the controller 57. The invention allows a clerk or other personnel member pictured in FIG. 5 at 59 to use a portable bar code scanner 61 to electronically read a shelf row bar code 51 and the UPC bar code of an item that the retailer has selected to be currently displayed at the row 16 of a particular shelf 11. The ability to electronically correlate the identity of a shelf row 16 and the item or product on the shelf 11 and to transmit this correlation to the controller 57 greatly improves productivity and reduces errors in collecting, transmitting and entering this data. To illustrate a typical shelf and tag layout in FIG. 5, no salable items are shown but, normally, the tags will be covered with salable items organized in rows aligned with bar codes 51. The bar code reader or scanner 61 electronically relays scanned information, through RF or hardwire communication to the controller 57. The controller 57 having this data in memory as well as the capacity of the row 16 will immediately know the shelf inventory of the relevant row based on the number of tags that are electromagnetically blocked on that row.

Figure 4:
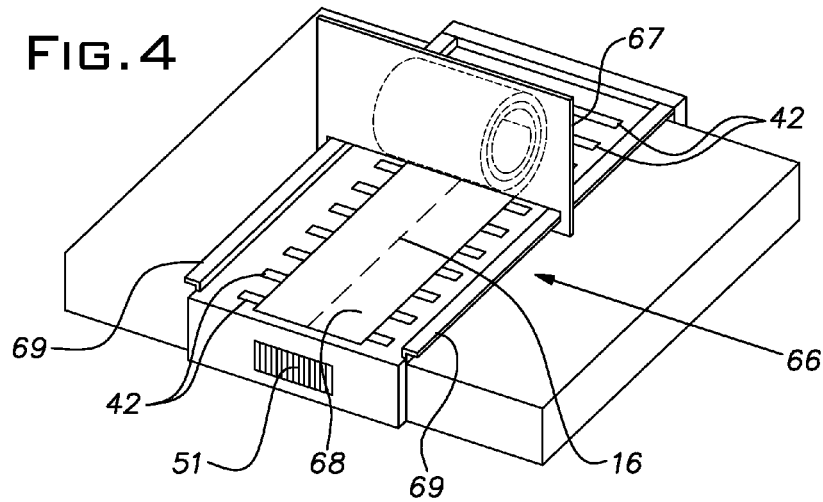
FIG. 4 is a diagrammatic perspective view of a row or tray of a modified form of a shelf.

FIG. 4 illustrates a variant of a retail shelf arrangement. A shelf dispenser unit 66 incorporates a spring actuated pusher plate 67 known in the art. The shelf dispenser unit 66 includes an electrically conductive strip in the form of a flat spring steel ribbon 68 coiled on itself. One end of the spring 68 is anchored to a front end of the unit 66 and the main body of the spring coil is journalled on an axis behind the pusher plate 67. The spring 68 exerts a generally constant forward force on the pusher plate 67 as well as any items placed in the row 16 ahead of the plate. The plate 67 is guided for movement between the front and back of the unit 66 on slides or tracks 69 running along the row 16. The unit 66 is loaded with retail items by manually pushing the plate 67 into the rear of the row and positioning items in front of it. A small barrier (not shown), is provided at the forward end of the unit 66 to restrain items and resist the force of the spring. The forwardmost item can be dispensed from the unit 66 by lifting it above the barrier.

For simplicity, only one shelf dispenser 66 is shown in FIG. 4, but it will be understood that a typical shelf will have several side-by-side parallel identically constructed units. As with the previously described shelf unit 10, each shelf dispenser 66 has a unique bar code 51 and a set of unique tags 42. The tags are evenly spaced along a row 16 of the shelf dispenser 66 beneath the path of the steel spring 68. The tags 42 can be provided on a composite panel like the panel assembly 41 described in connection with FIG. 2. The bar code 51 is registered with each of its associated tags 42, situated along the respective shelf dispenser 16, in the memory of the system controller 57. The spring 68 blocks radio wave communication between the shelf antennas 21 and the tags 42 it covers, i.e. the tags in front of the pusher plate 67 but not behind it. Thus, the tags 42 are masked by any overlying portion of the spring 68. The spring driven pusher plate style shelf dispenser is particularly useful with items that do not inherently block radio waves.

Figure 3:
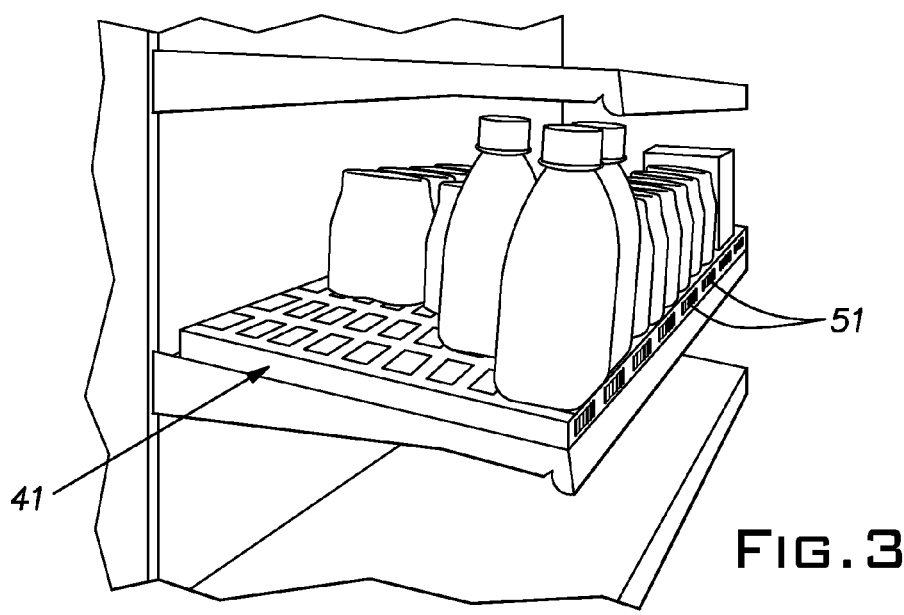
FIG. 3 is a fragmentary side perspective view of the shelf unit of FIG. 1.

Multiple shelf dispenser units 66 can be used in place of a panel 41 in the unit 10 described above in connection with FIGS. 1 and 3 and in the processes described in connection with the system of FIG. 5.

In some applications where the retail item is small, the spring 68 driving a pusher plate 67 may be relatively narrow. In such a case, the tags 42 can be aligned with the lengthwise direction of a shelf row 16 or otherwise oriented to ensure that the tags are adequately blocked when the spring overlies them. In such as case, resolution of the system is reduced such that removal of more than one item may be needed to register a change in the tags being read.

The shelf row 16 or shelf dispenser 66 can be identified by other than the optically scannable bar code 51. For example, these row or dispenser sites can be individually identified by an associated RFID tag, a magnetic code, optical characters or patterns, or other indicia that can be electronically read by a portable scanner and electronically coupled by wire or wireless to the reader (in the case of an RFID row or dispenser tag) or the controller 57.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A shelf system for displaying removable items, affording electronic data entry of shelved items and their shelf location, and maintaining real-time shelf inventory,
   the system including a shelf with at least one array of unique RFID tags distributed over the shelf and an optically readable bar code associated with and adjacent the at least one tag array;
   an antenna and reader for interrogating the tags of the at least one tag array;
   a ground plane below the at least one tag array shielding the at least one tag array from radio waves directed at the at least one tag array from below;

each of the removable item, item package, or mask associated with an item blocking radio wave communication between the antenna and an associated tag while a removable item is supported on the shelf and allowing the radio wave communication when removed from the shelf to electronically indicate the removable item's removal from the shelf;

an electronic controller in communication with the reader including a memory arranged to record the tag array bar code and an identity of tags associated with the tag array bar code and to record the identity of the tags that are responding to interrogation as a result of a removed removable item or removable items from the shelf;

an optical bar code reader configured to read the tag array bar code and a UPC bar code on items located at an array and to communicate data the optical bar code reader reads to the electronic controller whereby through contemporaneous reading of the tag array bar code and a UPC code on an item placed over tags in an array and communication of this data to the electronic controller, the electronic controller is enabled to electronically record an intended or actual tag array location of a removable item and whereby changes in the removable items associated with at least one tag array are electronically recorded in the memory of the electronic controller.

2. The shelf system as set forth in claim 1, wherein the tag array is a straight row extending between a front and a back of the shelf.

3. The shelf system as set forth in claim 2, wherein the tag array bar code is at a front edge of the shelf in line with the row of tags.

4. The shelf system as set forth in claim 2, wherein the row is one of a plurality of parallel rows of tags, said tags being mounted on a composite panel having an electrically conductive sheet at a lower side and a RF transparent core, the tags being adjacent an upper side of the composite panel.

5. The shelf system as set forth in claim 1, wherein the mask over the tags is provided by an electrically conducting ribbon that retracts as the removable items are removed from the shelf.

6. The shelf system as set forth in claim 5, wherein the electrically conducting ribbon forms a coiled spring that biases an item pusher from a rear of the shelf towards the front of the shelf.

7. A method of electronically establishing and maintaining a real-time shelf inventory database comprising steps of providing a shelf with an array of generally horizontally oriented unique RFID tags;

shielding the tag array from below with a conductive ground plane vertically spaced from the tag array;

providing an optically readable shelf bar code on the shelf in a known position relative to the tag array;

providing an RFID antenna, a reader, and a controller;

storing in an electronic memory of the controller a correlation of the individual tags of the array and a shelf tag array bar code;

arranging removable items on the shelf in a manner where each item shields a part or all of a tag in the array from radio waves directed by the antenna from above the shelf towards the tag array;

monitoring an inventory of the removable items on the shelf with the controller by interrogation of the shelf space with the antenna and the reader whereby tags responding to interrogation signals indicate removal of the removable items, the removable items associated with the array bearing identical UPC bar codes;

an association of the removable items and the array of tags being initially electronically established for inventory memory purposes by contemporaneously scanning the tag array bar code on the shelf and the corresponding removable item UPC bar code with the same bar code reader and reporting the tag array bar code and the removable item correspondence electronically from the bar code reader to the controller.

8. The method as set forth in claim 7, wherein the array is formed by a row of tags extending between a front and a rear of the shelf.

9. The method as set forth in claim 8, wherein multiple rows of tags are arranged in parallel on a common shelf and each of said rows has an associated unique bar code.

10. The shelf system for displaying removable items, affording electronic data entry of shelved items and their shelf location, and maintaining real-time shelf inventory;

the system including a shelf with at least one array of unique RFID tags distributed over the shelf and an electronically readable bar code associated with and adjacent the tag array;

an antenna and reader for interrogating the tag array;

a ground plane below the tag array shielding the tag array from radio waves directed at the tag array from below;

wherein each of the removable item, item package, or mask associated with an item blocking radio wave communication between the antenna and an associated tag while the removable item is supported on the shelf and allowing the radio wave communication when removed from the shelf to electronically indicate the removable item's removal from the shelf;

an electronic controller in communication with the reader including a memory arranged to record the tag array electronically readable bar code and an identity of tags associated with the tag array electronically readable bar code and to record the identity of the tags that are responding to interrogation as a result of the removed removable item or the removable items from the shelf;

an optical bar code reader configured to read a UPC bar code on items located at an array and of communication of data the optical bar code reader reads to the controller whereby through contemporaneous reading of the tag electronically readable array bar code and a UPC bar code on removable items placed over tags in an array and communication of this data to the controller, the controller is enabled to electronically record an intended or actual tag array location of the removable item and whereby changes in the removable items associated with the tag array are electronically recorded in the memory of the controller.

* * * * *